(12) United States Patent
Okuda et al.

(10) Patent No.: US 9,539,891 B2
(45) Date of Patent: Jan. 10, 2017

(54) HYBRID VEHICLE DRIVING APPARATUS

(71) Applicants: Koichi Okuda, Toyota (JP); Masafumi Yamamoto, Toyota (JP); Keita Imai, Toyota (JP); Atsushi Tabata, Okazaki (JP); Keisuke Omuro, Toyota (JP); Toshiki Kanada, Anjo (JP)

(72) Inventors: Koichi Okuda, Toyota (JP); Masafumi Yamamoto, Toyota (JP); Keita Imai, Toyota (JP); Atsushi Tabata, Okazaki (JP); Keisuke Omuro, Toyota (JP); Toshiki Kanada, Anjo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/424,363

(22) PCT Filed: Sep. 21, 2012

(86) PCT No.: PCT/JP2012/074288
§ 371 (c)(1),
(2) Date: Feb. 26, 2015

(87) PCT Pub. No.: WO2014/045415
PCT Pub. Date: Mar. 27, 2014

(65) Prior Publication Data
US 2015/0251530 A1 Sep. 10, 2015

(51) Int. Cl.
*B60K 6/365* (2007.10)
*B60K 6/445* (2007.10)
(Continued)

(52) U.S. Cl.
CPC ............. *B60K 6/40* (2013.01); *B60K 6/365* (2013.01); *B60K 6/387* (2013.01); *B60K 6/445* (2013.01);
(Continued)

(58) Field of Classification Search
CPC ........... B60K 6/40; B60K 6/445; B60K 6/365; Y10S 903/902
(Continued)

(56) References Cited

U.S. PATENT DOCUMENTS 5,823,281 A * 10/1998 Yamaguchi ............ B60K 6/387
180/65.235
8,870,706 B2 10/2014 Imamura et al.
(Continued)

FOREIGN PATENT DOCUMENTS

CN 104093617 A 10/2014
CN 104395121 A 3/2015
(Continued)

OTHER PUBLICATIONS

International Search Report Issued Nov. 13, 2012 in PCT/JP2012/074288 Filed Sep. 21, 2012.

*Primary Examiner* — Robert Hodge
*Assistant Examiner* — Stacey Fluhart
(74) *Attorney, Agent, or Firm* — Oblon, McClelland, Maier & Neustadt, L.L.P.

(57) ABSTRACT

A hybrid vehicle driving apparatus includes: an engine; a first rotator; a second rotator; a first differential mechanism configured to transmit a rotation of the engine to a driving wheel side; and a switching device configured to shift the first differential mechanism. The first rotator is coaxially disposed with the engine, the second rotator is disposed with the engine, the second rotator is disposed on a different axis from an axis of the engine to constitute a multiple-axis system, the first differential mechanism is coaxially disposed with and between the engine and the first rotator, and the switching device is disposed at an opposite side from the engine with respect to the first rotator.

5 Claims, 5 Drawing Sheets

(51) Int. Cl.
   *B60K 6/40*     (2007.10)
   *B60K 6/387*    (2007.10)
   *B60K 6/547*    (2007.10)
   *B60K 6/38*     (2007.10)

(52) U.S. Cl.
   CPC ......... *B60K 6/547* (2013.01); *B60K 2006/381* (2013.01); *Y02T 10/6239* (2013.01); *Y10S 903/902* (2013.01)

(58) Field of Classification Search
   USPC ........................................... 475/221
   See application file for complete search history.

(56) References Cited

U.S. PATENT DOCUMENTS

2013/0035186 A1* 2/2013 Martin ............... B60K 6/547
                                                    475/5
2013/0116867 A1* 5/2013 Thompson ............ B60W 20/00
                                                    701/22
2014/0155211 A1* 6/2014 Kozarekar ............ F16H 37/065
                                                    475/5

FOREIGN PATENT DOCUMENTS

| | | |
|---|---|---|
| JP | 2000 203289 | 7/2000 |
| JP | 2000-346187 A | 12/2000 |
| JP | 2005-199942 A | 7/2005 |
| JP | 2006-298066 A | 11/2006 |
| JP | 2008 120234 | 5/2008 |
| JP | 2012 30695 | 2/2012 |
| JP | 2012 35757 | 2/2012 |
| JP | 2012 137115 | 7/2012 |
| JP | 2013 82317 | 5/2013 |
| JP | 2013 95386 | 5/2013 |
| JP | 2013 112318 | 6/2013 |

* cited by examiner

| | | | | CL1 | BK1 | MG1 | MG2 |
|---|---|---|---|---|---|---|---|
| EV | FOR-WARD/BACK-WARD | SINGLE-DRIVE | DRIVE | | | G | M |
| | | | COMBINATION USE WITH EN-GINE BRAKE | △ | △ | G | M |
| | | BOTH-DRIVE | | O | O | M | M |
| HV | FOR-WARD | HIGH | | | O | G | M |
| | | LOW | | O | | G | M |
| | BACK-WARD | LOW | | O | | G | M |

O: ENGAGED   △: IN COMBINATION USE WITH ENGINE BRAKE, ONE OF THEM IS ENGAGED
G: MAINLY GENERATOR   M: MAINLY MOTOR BUT GENERATOR DURING REGENERATION

HYBRID VEHICLE DRIVING APPARATUS

FIELD

The present invention relates to a hybrid vehicle driving apparatus.

BACKGROUND

Conventionally, a hybrid vehicle that includes a transmission mechanism has been well known. For example, Patent Literature 1 discloses a technique of hybrid vehicle driving apparatus. The hybrid vehicle driving apparatus includes a transmission mechanism. The transmission mechanism shifts a rotation of an internal combustion engine and transmits the rotation to a power distribution mechanism. This driving apparatus aligns the internal combustion engine, a first motor-generator, and a second motor-generator, which are power sources, the transmission mechanism, a power split mechanism, and an output shaft on the same axis line. The driving apparatus is mainly applicable to a front engine, rear-wheel drive (FR) vehicle.

CITATION LIST

Patent Literature

Patent Literature 1: Japanese Laid-open Patent Publication No. 2008-120234

SUMMARY

Technical Problem

As disclosed in Patent Literature 1, there has been a need for improving mountability when applying the driving device which has an arrangement mainly applied to the FR vehicle to a front engine, front wheel drive (FF) vehicle or to a rear engine, rear-wheel drive (RR) vehicle, for example, since this configuration is spatially restricted by a side member or a similar member.

The present invention has been made in view of the above-described circumstances, and it is an object of the present invention to provide a hybrid vehicle driving apparatus that can improve the mountability.

Solution to Problem

To solve the above-described problem, a hybrid vehicle driving apparatus according to the present invention includes: an engine; a first rotator; a second rotator; a first differential mechanism configured to transmit a rotation of the engine to a driving wheel side; and a switching device configured to shift the first differential mechanism, wherein the first rotator is coaxially disposed with the engine, and the second rotator is disposed on a different axis from an axis of the engine to constitute a multiple-axis system, the first differential mechanism is coaxially disposed with and between the engine and the first rotator, and the switching device is disposed at an opposite side from the engine with respect to the first rotator.

Moreover, the above-described hybrid vehicle driving apparatus further includes a second differential mechanism that couples the first differential mechanism and the driving wheels, and the second differential mechanism includes: a first rotational element coupled to an output element of the first differential mechanism; a second rotational element coupled to the first rotator; and a third rotational element coupled to the second rotator and the driving wheels, and the second differential mechanism is coaxially disposed with and between the first differential mechanism and the first rotator.

Moreover, the above-described hybrid vehicle driving apparatus further includes a differential ring gear of a differential device disposed on a power transmission path from the second differential mechanism to the driving wheels on a different axis from the engine, and the differential ring gear is disposed at a position between the engine and the first rotator in an axial direction.

Moreover, the above-described hybrid vehicle driving apparatus further includes a pair of drive shafts configured to transmit a power from the differential device to the respective right and left driving wheels, and lengths of the pair of drive shafts from the differential device to the driving wheels are equal at right and left.

Advantageous Effects of Invention

A hybrid vehicle driving apparatus according to the present invention disposes a first differential mechanism and a switching device of a transmission unit separately. The hybrid vehicle driving apparatus disposes only the first differential mechanism between an engine and a first rotator. This provides effects of ensuring reducing a radial length of the transmission unit and improving the mountability.

DESCRIPTION OF EMBODIMENTS

Figure 1:
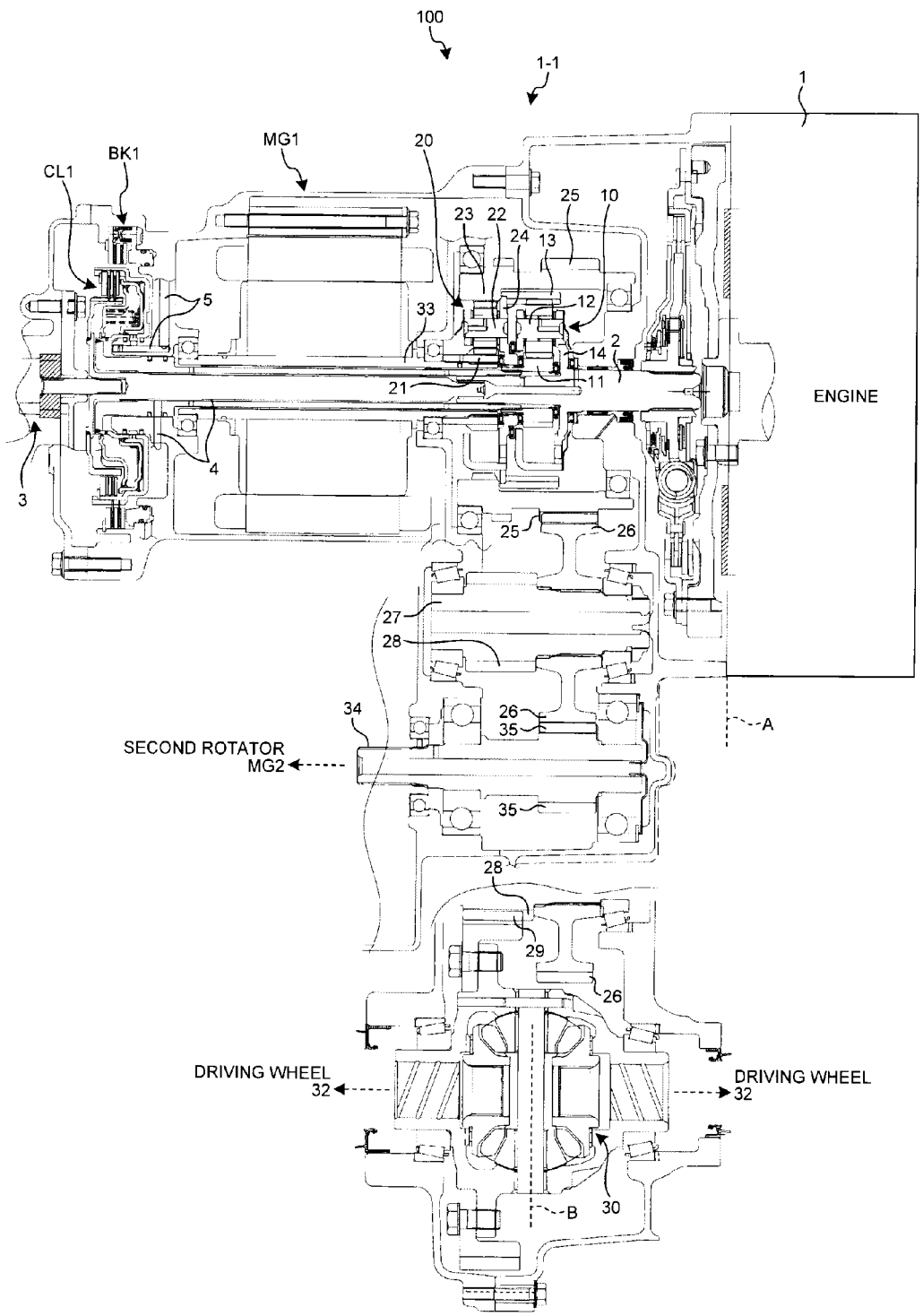
FIG. 1 is a cross-sectional view illustrating a hybrid vehicle driving apparatus according to one embodiment of the present invention.

Embodiments of a hybrid vehicle driving apparatus according to the present invention will be described hereinafter with reference to the drawings. In the following description, like reference numerals designate corresponding or identical elements throughout this embodiment, and therefore the descriptions of such elements will not be repeated.

Figure 2:
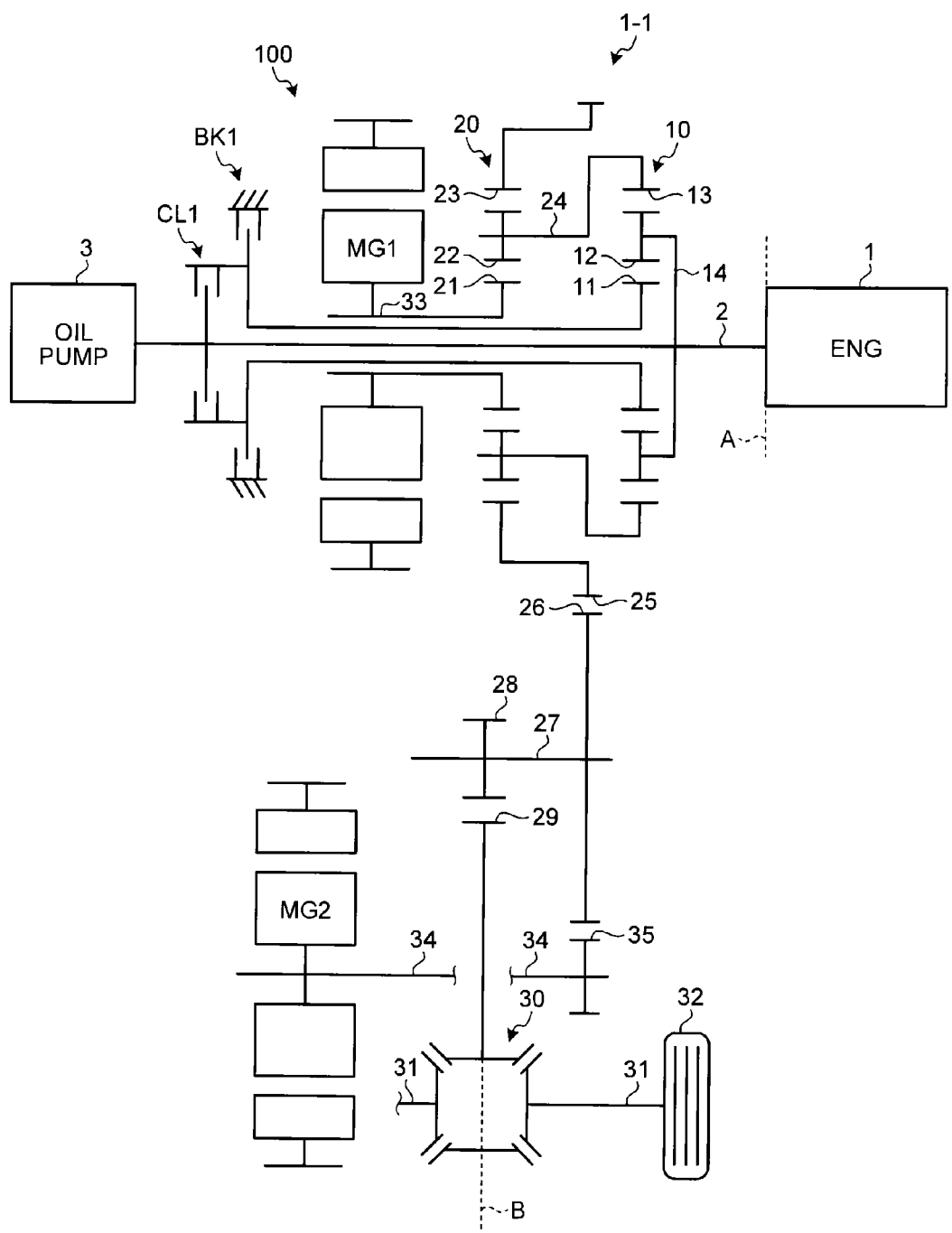
FIG. 2 is a skeleton diagram of the hybrid vehicle driving apparatus illustrated in FIG. 1.

Firstly, a description will be given of the configuration of the hybrid vehicle driving apparatus according to one embodiment of the present invention with reference to FIG. 1 to FIG. 3. FIG. 1 is a cross-sectional view illustrating the hybrid vehicle driving apparatus according to one embodiment of the present invention. FIG. 2 is a skeleton diagram of the hybrid vehicle driving apparatus illustrated in FIG. 1.

Figures 3, 4:
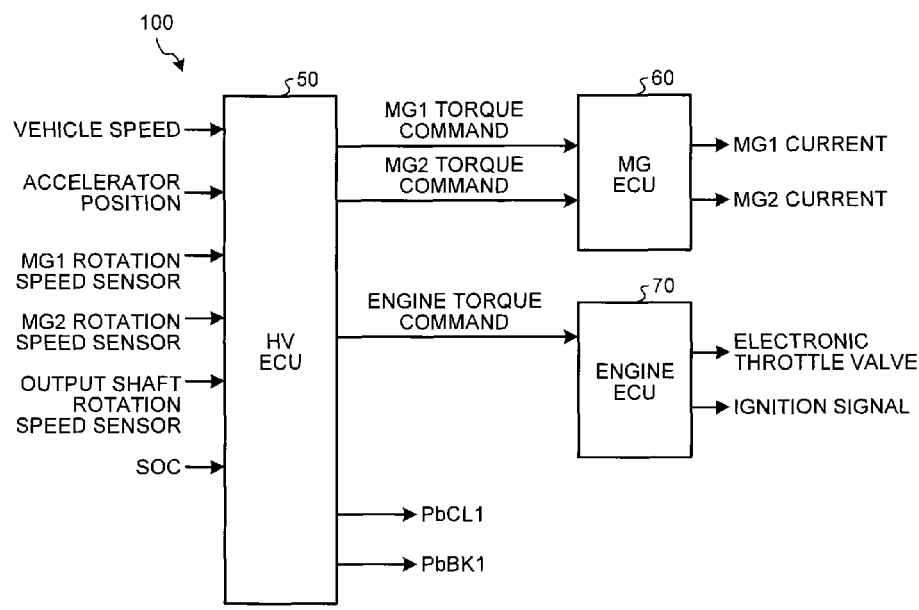
FIG. 3 illustrates a relationship of inputs to and outputs from a vehicle to which the hybrid vehicle driving apparatus according to this embodiment is applied.
FIG. 4 illustrates a table listing operations and engagements of the hybrid vehicle driving apparatus according to this embodiment.

FIG. 3 illustrates a relationship of inputs to and outputs from a vehicle to which the hybrid vehicle driving apparatus according to this embodiment is applied.

A vehicle 100 according to this embodiment is a hybrid vehicle that includes an engine 1, a first rotator MG1, and a second rotator MG2 as power sources. The vehicle 100 may be a plug-in hybrid vehicle that can be charged with an external power supply. As illustrated in FIG. 1 to FIG. 3, the vehicle 100 includes the engine 1, a first planetary gear mechanism 10, a second planetary gear mechanism 20, a first rotator MG1, a second rotator MG2, a clutch CL1, a brake BK1, an HV_ECU 50, an MG_ECU 60, and an engine_ECU 70.

A hybrid vehicle driving apparatus 1-1 according to this embodiment includes the first planetary gear mechanism 10, the second planetary gear mechanism 20, the clutch CL1, and the brake BK1. The hybrid vehicle driving apparatus 1-1 may further include control devices such as respective ECUs 50, 60, and 70. The hybrid vehicle driving apparatus 1-1 is applicable to a vehicle with a front engine, front wheel drive (FF) layout, a rear engine, rear-wheel drive (RR) layout, or the like. The hybrid vehicle driving apparatus 1-1 is, for example, mounted to the vehicle 100 such that the axial direction becomes a vehicle-width direction.

The hybrid vehicle driving apparatus 1-1 according to this embodiment includes a transmission unit. The transmission unit includes the first planetary gear mechanism 10, the clutch CL1 (first engagement element), and the brake BK1 (second engagement element). The hybrid vehicle driving apparatus 1-1 also includes a differential unit and a switching device. The differential unit includes the second planetary gear mechanism 20. The switching device includes the clutch CL1 and the brake BK1 and shifts the first planetary gear mechanism 10.

The engine 1 converts a combustion energy from fuel into a rotational motion of an output shaft and outputs the rotational motion. The output shaft of the engine 1 is coupled to an input shaft 2. The input shaft 2 is an input shaft of a power transmission device. The power transmission device includes the first rotator MG1, the second rotator MG2, the clutch CL1, the brake BK1, a differential device 30, and a similar component. The input shaft 2 is coaxially disposed with the output shaft of the engine 1 and extends from the output shaft. The input shaft 2 is coupled to a first carrier 14 of the first planetary gear mechanism 10.

The first planetary gear mechanism 10 of this embodiment is coupled to the engine 1. The first planetary gear mechanism 10 corresponds to the power transmission mechanism, which transmits the rotation of the engine 1. Here, as one example of the power transmission mechanism, the first planetary gear mechanism 10, which is a differential mechanism, is illustrated. The first planetary gear mechanism 10 is mounted to the vehicle 100 as the first differential mechanism. The first planetary gear mechanism 10 is a differential mechanism on the input side, which is disposed on the engine 1 side with respect to the second planetary gear mechanism 20. The first planetary gear mechanism 10 can shift and output the rotation of the engine 1. The first planetary gear mechanism 10 is a single pinion type. The first planetary gear mechanism 10 includes a first sun gear 11, a first pinion gear 12, a first ring gear 13, and the first carrier 14. The first planetary gear mechanism 10 may be a double-pinion type.

The first ring gear 13 is coaxially disposed with the first sun gear 11 and at radially outside of the first sun gear 11. The first pinion gear 12 is disposed between the first sun gear 11 and the first ring gear 13. The first pinion gear 12 engages the respective first sun gear 11 and first ring gear 13. The first carrier 14 rotatably supports the first pinion gear 12. The first carrier 14 is coupled to the input shaft 2 to integrally rotate with the input shaft 2. Therefore, the first pinion gear 12 can be rotated (revolved) around the central axis line of the input shaft 2 together with the input shaft 2. Additionally, the first pinion gear 12 can be rotated (rotated) around the central axis line of the first pinion gear 12 supported by the first carrier 14.

The clutch CL1 is a clutch device that can couple the first sun gear 11 and the first carrier 14. The clutch CL1, for example, can be configured as a clutch of frictional engagement type. However, this should not be construed in a limiting sense. The known clutch device such as a clutch of mesh type may be employed as the clutch CL1. For example, controlling the clutch CL1 by oil pressure engages or releases the clutch CL1. The clutch CL1 that is in perfectly engaged state couples the first sun gear 11 and the first carrier 14 to integrally rotate the first sun gear 11 and the first carrier 14. The perfectly engaging clutch CL1 restricts a differential of the first planetary gear mechanism 10. On the other hand, the released clutch CL1 detaches the first sun gear 11 and the first carrier 14 to allow relative rotation between the first sun gear 11 and the first carrier 14. That is, the released clutch CL1 allows the differential of the first planetary gear mechanism 10. The clutch CL1 can be controlled to be a semi-engagement state (slip engagement state).

The brake BK1 is a braking device that can restrict the rotation of the first sun gear 11. The brake BK1 includes an engagement element coupled to the first sun gear 11 and an engagement element coupled to a vehicle body side, for example, a casing of the power transmission device. The brake BK1 can be configured as a clutch device of the frictional engagement type, which is similar to the clutch CL1. However, this should not be construed in a limiting sense. The known clutch device such as a clutch of mesh type may be employed as the brake BK1. For example, controlling the brake BK1 by oil pressure engages or releases the brake BK1. The brake BK1 that is in perfectly engaged state couples the first sun gear 11 and a vehicle body side to restrict the rotation of the first sun gear 11. On the other hand, the released brake BK1 detaches the first sun gear 11 and the vehicle body side to allow rotation of the first sun gear 11. The brake BK1 can be controlled to be a semi-engagement state (slip engagement state).

The second planetary gear mechanism 20 of this embodiment corresponds to a differential mechanism that couples the first planetary gear mechanism 10 and driving wheels 32. The second planetary gear mechanism 20 is mounted to the vehicle 100 as a second differential mechanism. The second planetary gear mechanism 20 is a differential mechanism on the output side, which is disposed at the driving wheels 32 side with respect to the first planetary gear mechanism 10. The second planetary gear mechanism 20 is the single pinion type. The second planetary gear mechanism 20 includes a second sun gear 21, a second pinion gear 22, a second ring gear 23, and a second carrier 24. The second planetary gear mechanism 20 is coaxially disposed with the first planetary gear mechanism 10. The second planetary gear mechanism 20 is mutually opposed to the engine 1 sandwiching the first planetary gear mechanism 10.

The second ring gear 23 is coaxially disposed with the second sun gear 21 and at radially outside of the second sun gear 21. The second pinion gear 22 is disposed between the second sun gear 21 and the second ring gear 23. The second pinion gear 22 engages the respective second sun gear 21 and second ring gear 23. The second carrier 24 rotatably supports the second pinion gear 22. The second carrier 24 is coupled to the first ring gear 13 to integrally rotate with the first ring gear 13. Therefore, the second pinion gear 22 can be rotated (revolved) around the central axis line of the input shaft 2 together with the second carrier 24. Additionally, the second pinion gear 22 can be rotated (rotated) around the central axis line of the second pinion gear 22 supported by the second carrier 24. The first ring gear 13 is an output element of the first planetary gear mechanism 10. The first ring gear 13 can output the rotation input from the engine 1 to the first planetary gear mechanism 10 to the second carrier 24. The second carrier 24 corresponds to the first rotational element coupled to the output element of the first planetary gear mechanism 10.

A rotation shaft 33 of the first rotator MG1 is coupled to the second sun gear 21. The rotation shaft 33 of the first rotator MG1 is coaxially disposed with the input shaft 2. The rotation shaft 33 integrally rotates with the second sun gear 21. The second sun gear 21 corresponds to a second rotational element coupled to the first rotator MG1. A counter drive gear 25 is coupled to the second ring gear 23. The counter drive gear 25 is an output gear that integrally rotates with the second ring gear 23. The second ring gear 23 corresponds to a third rotational element coupled to the second rotator MG2 and the driving wheel 32. The second ring gear 23 is an output element that can output the rotation input from the first rotator MG1 or the first planetary gear mechanism 10 to the driving wheels 32. Although not illustrated in FIG. 1 and FIG. 2, both ends of the counter drive gear 25 in the axial direction are supported by a casing. This allows reducing deflexion of the axis compared with a support at one side.

The counter drive gear 25 engages a counter driven gear 26. The counter driven gear 26 is coupled to a drive pinion gear 28 via a counter shaft 27. The counter driven gear 26 integrally rotates with the drive pinion gear 28. A reduction gear 35 engages the counter driven gear 26. The reduction gear 35 is coupled to a rotation shaft 34 of the second rotator MG2. That is, the rotation of the second rotator MG2 is transmitted to the counter driven gear 26 via the reduction gear 35. The reduction gear 35 has a smaller diameter than the counter driven gear 26. The reduction gear 35 decelerates the rotation of the second rotator MG2 and transmits the rotation to the counter driven gear 26.

The drive pinion gear 28 engages a differential ring gear 29 of the differential device 30. The differential devices 30 are coupled to the driving wheels 32 via right and left drive shafts 31. The second ring gear 23 is coupled to the driving wheels 32 via the counter drive gear 25, the counter driven gear 26, the drive pinion gear 28, the differential devices 30, and the drive shafts 31. The second rotator MG2 is coupled to a power transmission path for the second ring gear 23 and the driving wheels 32. The second rotator MG2 can transmit powers to the respective second ring gear 23 and driving wheels 32.

In this embodiment, the position of the differential device 30, namely, a position of a differential output surface (coupling surface of the drive shaft 31) is set such that the right and left pair of drive shafts 31, which transmit the power to the right and left driving wheel 32, have an equal length at the right and left (so-called isometric drive shaft) to prevent torque steering. Reference numeral B in FIG. 2 denotes the differential output surface. If the right and left pair of drive shafts 31 have the equal length at the right and left, this means, for example, the respective lengths from the differential devices 30 to the right and left driving wheels 32 are equal. More specifically, this means that the respective lengths from the differential output surface B of the differential devices 30 to the right and left driving wheels 32 are equal.

The first rotator MG1 and the second rotator MG2 each have a function as a motor (electric motor) and a function as a generator. The first rotator MG1 and the second rotator MG2 are coupled to a battery via an inverter. The first rotator MG1 and the second rotator MG2 can convert an electric power supplied from the battery into a mechanical power and output the mechanical power. Additionally, the first rotator MG1 and the second rotator MG2 are driven by the input power and then can convert the mechanical power into electric power. The battery can charge the electric power generated by the rotators MG1 and MG2. As the first rotator MG1 and the second rotator MG2, for example, an AC synchronous motor-generator can be used.

As illustrated in FIG. 3, the vehicle 100 includes the HV_ECU 50, the MG_ECU 60, and the engine_ECU 70. The respective ECUs 50, 60, and 70 are electronic control units that include a computer. The HV_ECU 50 has a function of integrally controlling the entire vehicle 100. The MG_ECU 60 and the engine_ECU 70 are electrically coupled to the HV_ECU 50.

The MG_ECU 60 can control the first rotator MG1 and the second rotator MG2. For example, the MG_ECU 60 can adjust a current value supplied to the first rotator MG1 to control an output torque of the first rotator MG1. Additionally, the MG_ECU 60 can adjust a current value supplied to the second rotator MG2 to control the output torque of the second rotator MG2.

The engine_ECU 70 can control the engine 1. The engine_ECU 70, for example, can control a position of an electronic throttle valve of the engine 1. The engine_ECU 70 can output an ignition signal to control ignition of the engine 1. The engine_ECU 70 can also control injection of fuel for the engine 1. Thus, the engine_ECU 70 can control the output torque from the engine 1 by the position control on the electronic throttle valve, the ignition control, the injection control, or a similar control.

To the HV_ECU 50, a vehicle speed sensor, an accelerator position sensor, an MG1 rotation speed sensor, an MG2 rotation speed sensor, an output shaft rotation speed sensor, a battery (SOC) sensor, and a similar sensor are coupled. These sensors allow the HV_ECU 50 to obtain the vehicle speed, the accelerator position, the rotation speed of the first rotator MG1, the rotation speed of the second rotator MG2, the rotation speed of the output shaft of the power transmission device, the battery state SOC, and a similar state.

The HV_ECU 50, based on the obtained information, can calculate a requested driving power, a requested power, a requested torque, or a similar request to the vehicle 100. The HV_ECU 50, based on the calculated requested values, determines the output torque of the first rotator MG1 (hereinafter also referred to as an "MG1 torque"), the output torque of the second rotator MG2 (hereinafter also referred to as an "MG2 torque"), and the output torque of the engine 1 (hereinafter also referred to as an "engine torque"). The HV_ECU 50 outputs a command value of the MG1 torque and a command value of the MG2 torque to the MG_ECU 60. The HV_ECU 50 outputs the command value of the engine torque to the engine_ECU 70.

The HV_ECU 50 controls the respective clutch CL1 and brake BK1 based on a running mode, which will be described later, or a similar mode. The HV_ECU 50 outputs the respective command value (PbCL1) and command value (PbBK1). The command value (PbCL1) is for supplying oil pressure to the clutch CL1. The command value (PbBK1) is for supplying oil pressure to the brake BK1. A hydraulic control device (not illustrated) controls oil pressure supplied to the clutch CL1 and the brake BK1 according to the respective command values PbCL1 and PbBK1.

The vehicle 100 of this embodiment includes, as illustrated in FIG. 2, the first rotator MG1 coaxially disposed with the output shaft (input shaft 2) of the engine 1. The second rotator MG2 is disposed on the rotation shaft 34, which is different from the output shaft of the engine 1. That is, the hybrid vehicle driving apparatus 1-1 of this embodiment is a multiple-axis system. In the multiple-axis system, the input shaft 2 and the rotation shaft 34 of the second rotator MG2 are disposed on the different axes.

With the hybrid vehicle driving apparatus 1-1 of this embodiment, the first planetary gear mechanism 10 is disposed on the same axis line as the rotation shaft of the engine 1 and between the engine 1 and the first rotator MG1. The brake BK1 and the clutch CL1 as the switching device of the first planetary gear mechanism 10 are disposed at the opposite side from the engine 1 with respect to the first rotator MG1. The second planetary gear mechanism 20 is disposed between the first planetary gear mechanism 10 and the first rotator MG1. That is, with the hybrid vehicle driving apparatus 1-1 of this embodiment, the first planetary gear mechanism 10, the counter drive gear 25, the second planetary gear mechanism 20, the first rotator MG1, the brake BK1, and the clutch CL1 are disposed on the same axis line as the output shaft of the engine 1 in the order of closest to the engine 1.

The expression of "an element a is disposed between an element b and an element c" means that the element a does not overlap both the element b and the element c and is present between both at a position along the axial direction of the output shaft (input shaft 2) of the engine 1. When applying the first rotator MG1 to this expression, the first rotator MG1 is limited in a range of a rotor and a stator and therefore does not include the rotation shaft 33.

That is, with this embodiment, the first planetary gear mechanism 10, which functions as the transmission unit, is disposed separately from the brake BK1 and the clutch CL1. Between the engine 1 and the second planetary gear mechanism 20 (differential unit), only the first planetary gear mechanism 10 is disposed. The first planetary gear mechanism 10 is disposed connecting to the second planetary gear mechanism 20.

The input shaft 2 passes through the inside of the rotation shaft 33 of the MG1 and further extends from the brake BK1 and the clutch CL1 to the engine 1, the opposite side. Then, the input shaft 2 is coupled to a mechanical oil pump 3. The mechanical oil pump 3 is coaxially disposed with the engine 1, the first planetary gear mechanism 10, the second planetary gear mechanism 20, and the first rotator MG1. The mechanical oil pump 3 is mutually opposed to the engine 1 sandwiching the first planetary gear mechanism 10, the second planetary gear mechanism 20, and the first rotator MG1. The mechanical oil pump 3 is coupled to the output shaft of the engine 1 via the input shaft 2. The mechanical oil pump 3 is driven by driving power of the engine 1.

The mechanical oil pump 3 is driven by the engine 1 as a driving source to supply operation oil to the switching device, which includes the clutch CL1 and the brake BK1. Further, the mechanical oil pump 3 supplies lubricating oil to the first planetary gear mechanism 10 and the second planetary gear mechanism 20.

Comparatively low oil pressure is sufficient as the lubricating oil to be supplied to the first planetary gear mechanism 10 and the second planetary gear mechanism 20. The lubricating oil, for example, as illustrated in FIG. 1, passes through lubricating oil passages 4, which are formed at gaps at the input shaft 2 and the rotation shaft 33 of the first rotator MG1. Then, the lubricating oil is supplied from the mechanical oil pump 3 to the first planetary gear mechanism 10 and the second planetary gear mechanism 20.

On the other hand, the operation oil to be supplied to the switching device requires a comparatively high oil pressure for engagement/release operations on the clutch CL1 and the brake BK1. In view of this, oil discharged from the oil pump 3, for example, passes through a hydraulic pressure control circuit (not illustrated) and then is controlled at high pressure. Then, as illustrated in FIG. 1, the oil passes through oil supply passages 5 and is supplied to the switching device. The switching device is disposed on the engine 1 side integrally with the first planetary gear mechanism 10. In the case where the switching device is disposed separately from the oil pump 3, to supply the high-pressure operation oil to the switching device, oil supply passages longer than the oil supply passages 5 illustrated in FIG. 1 are required. Alternatively, an oil pump different from the oil pump 3 needs to be disposed close to the switching device. A drive shaft that transmits engine power to this pump or a similar shaft needs to be additionally disposed. In contrast to this, in this embodiment, the switching device is disposed separately from the first planetary gear mechanism 10 but close to the mechanical oil pump 3. This facilitates a supply of the operation oil to the switching device. This allows the one mechanical oil pump 3 to supply the lubricating oil to the first planetary gear mechanism 10 and the second planetary gear mechanism 20 and also supply the operation oil to the clutch CL1 and the brake BK1. Accordingly, oil can be preferably supplied with a simple configuration.

In this embodiment, the differential ring gear 29 has a positional relationship where the differential ring gear 29 is disposed between the engine 1 and the first rotator MG1 along the axial direction of the output shaft of the engine 1. The counter drive gear 25, which transmits power in conjunction with the output element (second ring gear 23) of the differential unit, is disposed between the differential ring gear 29 and the engine 1.

Here, as denoted by reference numeral A in FIG. 2, an end surface of the engine 1 on the driving apparatus 1-1 side, in other words, an end surface of the engine 1 opposed to the first planetary gear mechanism 10 is referred to as an "engine matching surface." As denoted by reference numeral B, a surface passing through the middle point of end surfaces of the opposed right and left drive shafts 31 of the differential devices 30 and perpendicular to the axial direction of the output shaft of the engine 1 is referred to as the "differential output surface." The positional relationship between the engine matching surface A and the differential output surface B is determined by a positional relationship between A and B of the conventional vehicle and dimensions of the existing drive shafts 31. With the conventional hybrid vehicle that does not include the transmission unit (first planetary gear mechanism 10, clutch CL1, and brake BK1), the positional relationship of the engine 1, the second planetary gear mechanism 20, the first rotator MG1, the counter drive gear 25, and the differential ring gear 29 has been designed so as to meet this positional relationship. Especially, the counter drive gear 25 was designed so as to be disposed between the differential ring gear 29 and the engine 1 along the axial direction of the output shaft of the engine 1.

Generally, to dispose the transmission unit (first planetary gear mechanism 10, clutch CL1, and brake BK1) integratedly, the switching device (clutch CL1 and brake BK1) is disposed at the outer circumference side of the first planetary gear mechanism 10. In view of this, when adding the transmission unit between the engine 1 and the second planetary gear mechanism 20, since the radial length of the transmission unit is large, a space for disposing the counter drive gear 25 cannot be ensured. Therefore, the counter drive gear 25 cannot be disposed between the differential ring gear 29 and the engine 1. Alternatively, even if the switching device is disposed axially parallel to the first planetary gear mechanism 10, a similar problem occurs. In this case, to maintain the positional relationship between the engine matching surface A and the differential output surface B, a new power transmission element (such as a shaft and a gear) needed to be added subsequent to the counter drive gear 25. Alternatively, the drive shafts 31 needed to be newly installed at the right and left.

When disposing the transmission unit integrally and disposing the switching device (clutch CL1 and brake BK1) at the outer circumference side of the first planetary gear mechanism 10, due to the relationship with the radius of the casing, the axial length may be increased.

In contrast to this, in this embodiment, as illustrated in FIG. 1 and FIG. 2, among the elements of the transmission unit, only the first planetary gear mechanism 10 is disposed between the engine 1 and the second planetary gear mechanism 20. The brake BK1 and the clutch CL1 are disposed separately from the first planetary gear mechanism 10, at the opposite side from the engine 1. Accordingly, even if the transmission unit is additionally arranged between the engine 1 and the second planetary gear mechanism 20, the redial length or the axial length can be reduced. This allows ensuring the space for disposing the counter drive gear 25 at the outer circumference side of the first planetary gear mechanism 10. In view of this, similar to the conventional arrangement, the counter drive gear 25 can be disposed between the differential ring gear 29 and the engine 1 along the axial direction of the output shaft of the engine 1. Consequently, even if the transmission unit is added, the positional relationship between the engine matching surface A and the differential output surface B can be maintained without adding the new power transmission element and newly installing the drive shafts. This allows utilizing the components such as the shaft and the gear of the conventional hybrid vehicle driving apparatus, which does not include the transmission unit. Additionally, the drive shafts can also be utilized.

With the conventional integrated transmission unit, the switching device (clutch CL1 and brake BK1) is disposed at the outer circumference side of the first planetary gear mechanism 10. Accordingly, for example, the radial length of the transmission unit was sometimes larger than the radial length of the MG1, which was on the same axis. In contrast to this, this embodiment disposes the switching device separately from the first planetary gear mechanism 10. This allows reducing radial lengths of both the first planetary gear mechanism 10 and the switching device. For example, as illustrated in FIG. 1 and FIG. 2, the radial lengths of both the first planetary gear mechanism 10 of the transmission unit and the switching device can be shorter than the radial length of the first rotator MG1.

In this embodiment, as illustrated in FIG. 1 and FIG. 2, in the switching device, the brake BK1 is disposed at the outer circumference side of the clutch CL1. This further allows shortening the axial dimensions.

Next, with reference to FIG. 4 to FIG. 8, the following describes the operation of the hybrid vehicle driving apparatus 1-1 according to this embodiment.

FIG. 4 illustrates a table listing operations and engagements of the hybrid vehicle driving apparatus 1-1 according to this embodiment. The vehicle 100 can selectively execute hybrid (HV) running or EV running. The HV running is a running mode that runs the vehicle 100 using both the engine 1 and the second rotator MG2 or one of the engine 1 and the second rotator MG2 as a power source.

The EV running is a running mode that runs using least any one of the first rotator MG1 and the second rotator MG2 as a power source. The EV running allows running while stopping the engine 1. The hybrid vehicle driving apparatus 1-1 according to this embodiment has the single-motor EV mode (single-drive EV mode) and the both-motor EV mode (both-drive EV mode) as the EV running mode. The single-motor EV mode causes the vehicle 100 to run using the second rotator MG2 as a single power source. The both-motor EV mode causes the vehicle 100 to run using the first rotator MG1 and the second rotator MG2 as power sources.

Figure 5:
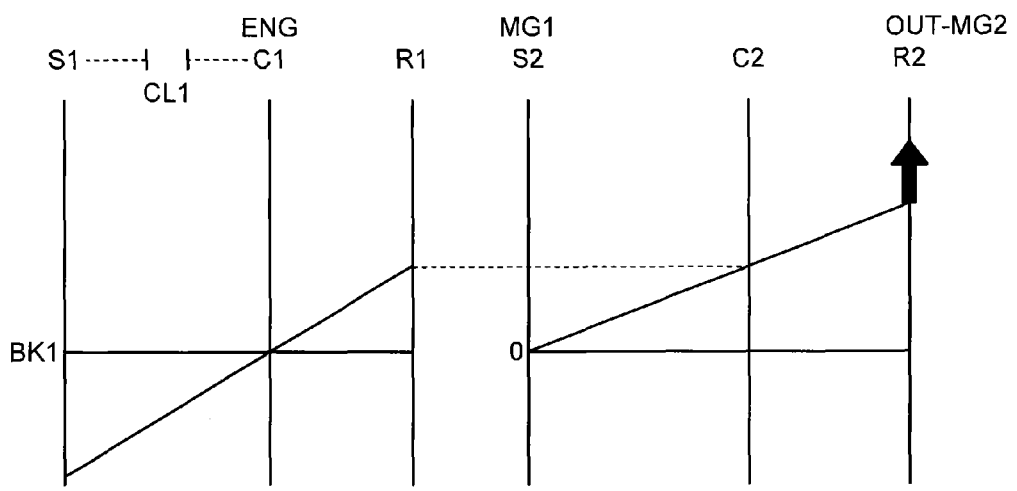
FIG. 5 is a collinear diagram regarding a single-motor EV mode.

In the engagement table in FIG. 4, the circles in the clutch CL1 columns and the brake BK1 columns indicate the "engaged" state while the blanks indicate the "released" state. The triangles indicate that any of the clutch CL1 and the brake BK1 is engaged and the other is released. The single-motor EV mode is, for example, executed releasing both the clutch CL1 and the brake BK1. FIG. 5 is a collinear diagram regarding the single-motor EV mode. In the collinear diagram, reference numerals S1, C1, and R1 indicate the first sun gear 11, the first carrier 14, and the first ring gear 13, respectively. Reference numerals S2, C2, and R2 indicate the second sun gear 21, the second carrier 24, and the second ring gear 23, respectively.

The single-motor EV mode releases the clutch CL1 and the brake BK1. Releasing the brake BK1 allows the rotation of the first sun gear 11. Releasing the clutch CL1 allows differential of the first planetary gear mechanism 10. The HV_ECU 50 outputs a positive torque to the second rotator MG2 via the MG_ECU 60 to cause the vehicle 100 to generate the driving power in the forward direction. The second ring gear 23 rotates in the positive direction in conjunction with the rotation of the driving wheels 32. Here, the positive rotation is assumed as the rotation direction of the second ring gear 23 during the forward movement of the vehicle 100. The HV_ECU 50 causes the first rotator MG1 to operate as the generator to reduce a drag loss. Specifically, the HV_ECU 50 applies a slight torque to cause the first rotator MG1 to generate electricity to set the rotation speed of the first rotator MG1 zero rotations. This allows reducing the drag loss of the first rotator MG1. In the case where the rotation speed of the MG1 can be maintained at 0 by using a cogging torque even setting the MG1 torque "0", the MG1 torque may not be applied. Alternatively, d shaft lock of the first rotator MG1 may set the MG1 rotation speed "0."

The first ring gear 13 rotates in the positive direction being dragged by the second carrier 24. Since the first planetary gear mechanism 10 is in a neutral state where the clutch CL1 and the brake BK1 are released, the engine 1 is not dragged round, and the first carrier 14 stops rotating. Accordingly, the great amount of regeneration can be obtained. The first sun gear 11 idles while rotating in the negative direction. The first planetary gear mechanism 10 in the neutral state is in a state where a power is not transmitted between the first ring gear 13 and the first carrier 14. That is, the neutral state is a state where the engine 1 and the second planetary gear mechanism 20 are detached and the transmission of the power is cut off. If at least any one of the clutch CL1 and the brake BK1 engages, the first planetary gear mechanism 10 enters a coupling state of coupling the engine 1 and the second planetary gear mechanism 20.

During the running in the single-motor EV mode, there may be a case where the state of charge of battery becomes full and therefore regenerated energy cannot be obtained. In this case, a combination use of an engine brake is a possible solution. Engaging the clutch CL1 or the brake BK1 allows coupling the engine 1 to the driving wheels 32, thus allowing the engine brake to act on the driving wheels 32. As indicated with the triangles in FIG. 4, engaging the clutch CL1 or the brake BK1 in the single-motor EV mode drags the engine 1 and increases the engine rotation speed with the first rotator MG1, thus ensuring the engine brake state.

Figure 6:
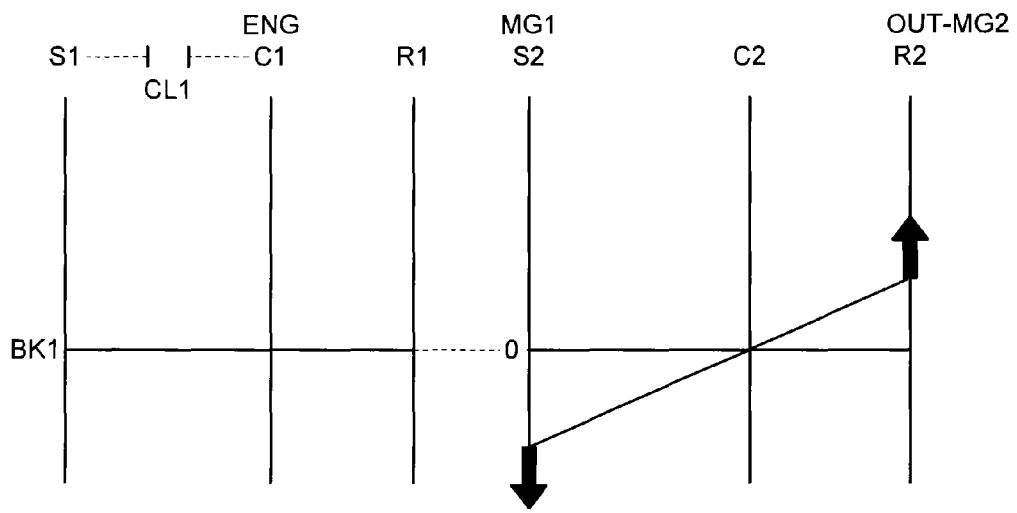
FIG. 6 is a collinear diagram regarding a both-motor EV mode.

In the both-motor EV mode, the HV_ECU 50 engages the clutch CL1 and the brake BK1. FIG. 6 is a collinear diagram regarding the both-motor EV mode. Engaging the clutch CL1 restricts the differential of the first planetary gear mechanism 10. Engaging the brake BK1 restricts the rotation of the first sun gear 11. Therefore, all the rotational elements of the first planetary gear mechanism 10 stop rotating. Restricting the rotation of the first ring gear 13, which is the output element, locks the second carrier 24, which is coupled to the first ring gear 13, to zero rotation.

The HV_ECU 50 causes the respective first rotator MG1 and second rotator MG2 to output the torque for running and driving. Restricting the rotation of the second carrier 24 allows obtaining reactive force against the torque from the first rotator MG1 and allows outputting the torque from the first rotator MG1 from the second ring gear 23. The first rotator MG1 outputs the negative torque during the forward movement and rotates in the negative direction. This allows causing the second ring gear 23 to output the positive torque. On the other hand, the first rotator MG1 outputs the positive torque and rotates in the positive direction during backward movement. This allows outputting the negative torque from the second ring gear 23.

Figure 7:
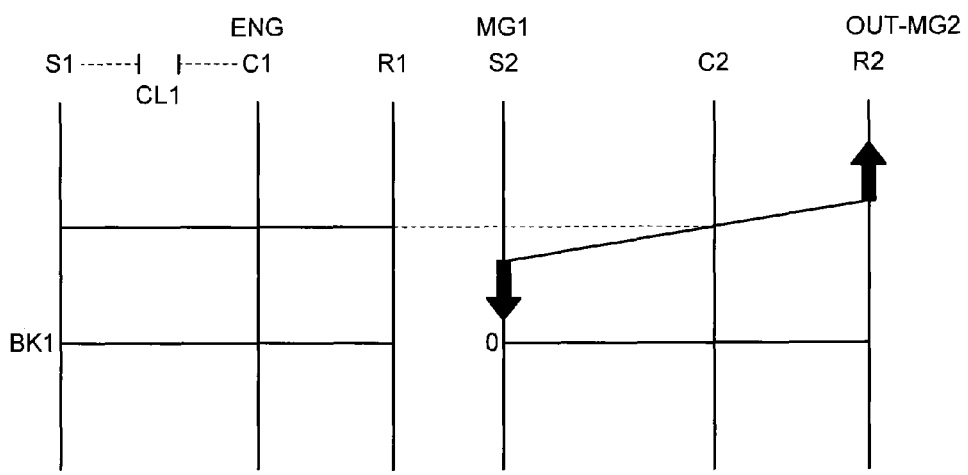
FIG. 7 is a collinear diagram regarding an HV running mode in a low state.
Figure 8:
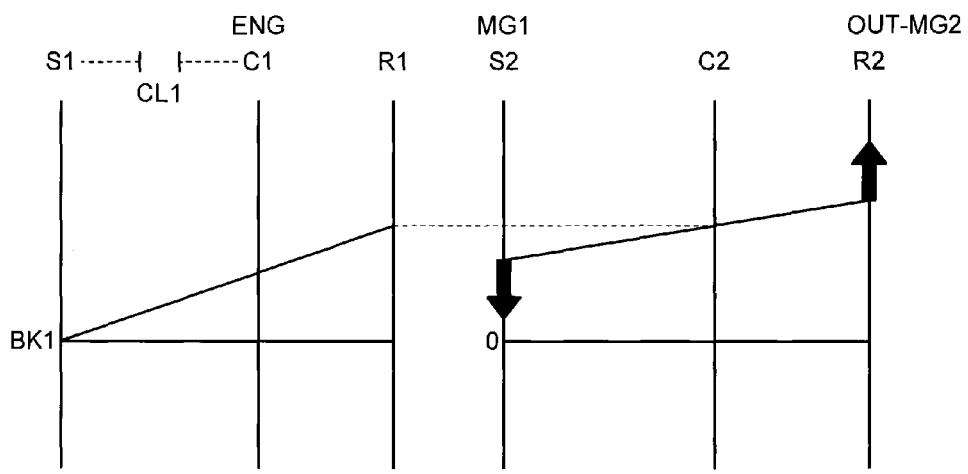
FIG. 8 is a collinear diagram regarding the HV running mode in a high state.

In the HV running, the second planetary gear mechanism 20 as the differential unit is basically in the operating state. The first planetary gear mechanism 10, which is the transmission unit, is switched between low and high. FIG. 7 is a collinear diagram regarding the HV running mode in a low state (hereinafter also referred to as an "HV low mode"). FIG. 8 is a collinear diagram regarding the HV running mode in a high state (hereinafter also referred to as an "HV high mode".)

In the HV low mode, the HV_ECU 50 engages the clutch CL1 and releases the brake BK1. Engaging the clutch CL1 restricts the differential of the first planetary gear mechanism 10. This integrally rotates the respective rotational elements 11, 13, and 14. Accordingly, the rotation of the engine 1 is not accelerated or decelerated. Thus, the rotation is transmitted from the first ring gear 13 to the second carrier 24 at the same speed.

On the other hand, in the HV high mode, the HV_ECU 50 releases the clutch CL1 and engages the brake BK1. Engaging the brake BK1 restricts the rotation of the first sun gear 11. This sets the first planetary gear mechanism 10 an overdrive (OD) state. The overdrive state accelerates the rotation of the engine 1 input to the first carrier 14 and outputs the rotation from the first ring gear 13. Thus, the first planetary gear mechanism 10 can accelerate the rotation of the engine 1 and output the rotation. A gear ratio of the first planetary gear mechanism 10 during overdrive can be set to, for example, 0.7.

Thus, the switching device, which is formed of the clutch CL1 and the brake BK1, switches a state of restricting the differential of the first planetary gear mechanism 10 and a state of allowing the differential of the first planetary gear mechanism 10 to shift the first planetary gear mechanism 10. The hybrid vehicle driving apparatus 1-1 can switch the HV high mode and the HV low mode by the transmission unit, which includes the first planetary gear mechanism 10, the clutch CL1, and the brake BK1. This allows improving transmission efficiency of the vehicle 100. To a latter part of the transmission unit, the second planetary gear mechanism 20 as a differential unit is coupled in series. Since the first planetary gear mechanism 10 is switchable to the overdrive, this is advantageous in that the first rotator MG1 needs not to be highly torqued significantly.

The following describes effects of the hybrid vehicle driving apparatus 1-1 according to this embodiment.

A hybrid vehicle driving apparatus 1-1 according to the embodiment includes the engine 1, a first rotator MG1, a second rotator MG2, the first planetary gear mechanism 10, a clutch CL1, and a brake BK1. The first planetary gear mechanism 10 transmits a rotation of the engine 1 to a driving wheel 32 side. The clutch CL1 and the brake BK1 are switching device that shift the first planetary gear mechanism 10. The first rotator MG1 and a second rotator MG2 constitute a multiple-axis system. The first rotator MG1 is coaxially disposed with the engine 1. The second rotator MG2 is disposed on a different axis from the engine 1. The first planetary gear mechanism 10 is coaxially disposed with and between the engine 1 and the first rotator MG1. The clutch CL1 and the brake BK1 are disposed at an opposite side from the engine 1 with respect to the first rotator MG1.

This configuration disposes the clutch CL1 and the brake BK1 separately from the first planetary gear mechanism 10, which is the element of the transmission unit. Among the elements of the transmission unit, only the first planetary gear mechanism 10 is disposed between the engine 1 and the first rotator MG1. This allows reducing the radial length and the axial length of the transmission unit, thus ensuring improving mountability. Accordingly, for example, when applying the driving device to a front engine, front wheel drive (FF) vehicle and a rear engine, rear-wheel drive (RR) vehicle, which has a configuration spatially restricted by a side member or a similar member, this is advantageous in terms of mounting.

The hybrid vehicle driving apparatus 1-1 of this embodiment includes the second planetary gear mechanism 20. The second planetary gear mechanism 20 couples the first planetary gear mechanism 10 and the driving wheels 32. The second planetary gear mechanism 20 includes the second carrier 24, the second sun gear 21, and the second ring gear 23. The second carrier 24 is coupled to the output element (first ring gear 13) of the first planetary gear mechanism 10. The second sun gear 21 is coupled to the first rotator MG1. The second ring gear 23 is coupled to the second rotator MG2 and the driving wheels 32. The second planetary gear mechanism 20 is coaxially disposed with and between the first planetary gear mechanism 10 and the first rotator MG1.

This configuration disposes the first planetary gear mechanism 10 and the second planetary gear mechanism 20 adjacent to one another. Accordingly, the lubricating oil passages for both can be aggregated.

The embodiment of the present invention is described above. It should be understood that the present embodiment is in all respects illustrative and is not intended to limit the technical scope of the present invention. The described embodiment can be performed in other various forms, various kinds of removals, replacements and modifications may be possible without departing from the spirit of the present invention. The embodiment and the modification are intended to be embraced in the range and gist of the present invention, and are intended to be embraced in the invention disclosed in the range of the claims and the equivalency thereof.

The embodiment exemplifies the configuration that disposes the brake BK1 and the clutch CL1, which are the switching device in the transmission unit, in the order of the brake BK1 and the clutch CL1 from the engine 1 side. However, it is only necessary that the switching device be disposed at the opposite side from the engine 1 with respect to the first rotator MG1. Therefore, the positions of the brake BK1 and the clutch CL1 may be changed.

The embodiment, as illustrated in FIG. 1, exemplifies the configuration that arranges the brake BK1 at the outer circumference side of the clutch CL1 in the switching device. However, for example, the clutch CL1 and the brake BK1 may be disposed axially parallel to further decrease the radial length of the switching device.

REFERENCE SIGNS LIST 1-1 hybrid vehicle driving apparatus
1 engine
10 first planetary gear mechanism (first differential mechanism)
11 first sun gear
13 first ring gear
14 first carrier
20 second planetary gear mechanism (second differential mechanism)
21 second sun gear (second rotational element)
23 second ring gear (third rotational element)
24 second carrier (first rotational element)
29 differential ring gear
31 drive shaft
32 driving wheel
50 HV_ECU
60 MG_ECU
70 engine_ECU
100 vehicle
CL1 clutch (switching device)
BK1 brake (switching device)
MG1 first rotator
MG2 second rotator

The invention claimed is:

1. A hybrid vehicle driving apparatus, comprising:
an engine;
a first rotator;
a second rotator;
a first differential mechanism configured to transmit a rotation of the engine to a driving wheel side;
a switching device configured to shift the first differential mechanism, and
a second differential mechanism that couples the first differential mechanism and driving wheels the second differential mechanism including
a first rotational element coupled to an output element of the first differential mechanism,
a second rotational element coupled to the first rotator, and
a third rotational element coupled to the second rotator and the driving wheels, wherein
the first rotator is coaxially disposed with the engine, and the second rotator is disposed on a different axis from an axis of the engine to constitute a multiple-axis system,
the first differential mechanism is coaxially disposed with and between the engine and the first rotator,
the switching device is disposed at an opposite side from the engine with respect to the first rotator,
the second differential mechanism is coaxially disposed with and between the first differential mechanism and the first rotator,
a counter drive gear is coupled to the third rotational element, and
the counter drive gear is disposed at an outer circumference side of the first differential mechanism,
the first differential mechanism is a first planetary gear mechanism including a first sun gear, a first pinion gear, a first ring gear, and a first carrier,
the switching device includes a clutch configured to couple the first sun gear and the first carrier,
a coupling shaft that couples the first sun gear and the clutch passes through an inside of a rotation shaft of the first rotator, and
the first carrier is coupled to the clutch via an input shaft which is coupled to an output shaft of the engine.

2. The hybrid vehicle driving apparatus according to claim 1, wherein
the input shaft is passed through the inside of the rotation shaft of the first rotator, and
the hybrid vehicle driving apparatus further comprises a mechanical oil pump which is coupled to the input shaft.

3. The hybrid vehicle driving apparatus according to claim 1, wherein
the switching device further includes a brake configured to restrict a rotation of the first sun gear, and
a coupling shaft that couples the first sun gear and the brake passes through the inside of the rotation shaft of the first rotator.

4. The hybrid vehicle driving apparatus according to claim 3, wherein the brake is disposed at an outer circumference side of the clutch.

5. The hybrid vehicle driving apparatus according to claim 3, wherein
the hybrid vehicle driving apparatus is configured to set a both-motor EV mode in which both the clutch and the brake are engaged.

* * * * *